United States Patent
Hees (10) Patent No.: US 9,074,881 B2
(45) Date of Patent: Jul. 7, 2015

(54) MEASUREMENT SYSTEM, PIPE HANDLING SYSTEM AND METHOD OF JOINING PIPE SECTIONS

(75) Inventor: Stefan Willem Hees, Breda (NL)

(73) Assignee: HEEREMA MARINE CONTRACTORS NEDERLAND SE, Leiden (NL)

( * ) Notice: Subject to any disclaimer, the term of this patent is extended or adjusted under 35 U.S.C. 154(b) by 575 days.

(21) Appl. No.: 12/995,712

(22) PCT Filed: Jun. 5, 2009

(86) PCT No.: PCT/NL2009/000129
§ 371 (c)(1),
(2), (4) Date: Dec. 2, 2010

(87) PCT Pub. No.: WO2009/148304
PCT Pub. Date: Dec. 10, 2009

(65) Prior Publication Data
US 2011/0079584 A1     Apr. 7, 2011

Related U.S. Application Data

(60) Provisional application No. 61/059,201, filed on Jun. 5, 2008.

(51) Int. Cl.
| | |
|---|---|
| *B23K 9/00* | (2006.01) |
| *F16L 1/235* | (2006.01) |
| *G01B 21/24* | (2006.01) |
| *E21B 19/16* | (2006.01) |
| *F16L 1/10* | (2006.01) |
| *F16L 1/20* | (2006.01) |

(52) U.S. Cl.
CPC ............... *G01B 21/24* (2013.01); *E21B 19/16* (2013.01); *F16L 1/10* (2013.01); *F16L 1/207* (2013.01); *F16L 1/235* (2013.01)

(58) Field of Classification Search
USPC ............ 219/60 A, 61; 228/9, 44.5, 49.3, 103, 228/119, 212; 33/613
See application file for complete search history.

(56) References Cited

U.S. PATENT DOCUMENTS

| | | | |
|---|---|---|---|
| 4,468,155 A * | 8/1984 | Levallois et al. ............... | 405/170 |
| 4,513,504 A | 4/1985 | Nussbaumer et al. | |
| 4,832,530 A | 5/1989 | Andersen et al. | |
| 2004/0244509 A1* | 12/2004 | Savitski ........................ | 73/865.8 |
| 2005/0247686 A1* | 11/2005 | Child ........................ | 219/124.34 |

FOREIGN PATENT DOCUMENTS

| | | |
|---|---|---|
| DE | 20 2004 000 503 U1 | 4/2004 |
| WO | 2006112689 A1 | 10/2006 |
| WO | 2008030079 A1 | 11/2010 |

* cited by examiner

Primary Examiner — Brian Jennison
(74) Attorney, Agent, or Firm — Hoffmann & Baron, LLP (57) ABSTRACT

The invention relates to a measurement system constructed and arranged to measure geometrical data from two pipe end bevels of two pipes that need to be joined. The measurement system being provided with a measuring device, wherein the measurement system is constructed and arranged so that the measuring device is moveable in between the two pipe end bevels and the measuring device has a part of a different one of the two pipe end bevels within its measurement angle.

17 Claims, 7 Drawing Sheets

MEASUREMENT SYSTEM, PIPE HANDLING SYSTEM AND METHOD OF JOINING PIPE SECTIONS

CROSS-REFERENCE TO RELATED APPLICATIONS

This application is the National Stage of International Application No. PCT/NL2009/000129, filed Jun. 5, 2009, which claims the benefit of U.S. Provisional Application No. 61/059,201, filed Jun. 5, 2008, the contents of which is incorporated by reference herein.

FIELD OF THE INVENTION

The present invention relates to a measurement system constructed and arranged to measure geometrical data from two pipe end bevels of two pipe sections that need to be joined, the measurement system being provided with at least one measuring device.

BACKGROUND OF THE INVENTION

In the offshore industry there is a need for underwater pipelines. These underwater pipelines may be provided by joining pipe sections together to form a pipeline which is lowered from a vessel to an underwater bottom. In such a pipe laying method a plurality of pipe sections are welded to one another to form the pipeline, hang down from a vessel, where an upper end of the most recently joined pipe section is to be welded to a lower end of a new pipe section being lined up above said upper end. The pipe ends of the pipe sections may be provided with a collar for handling of the pipe sections and the pipe line. Upon completion of a weld, the end of the pipeline is gripped by the collar with a clamp and lowered to just below the welding position to prepare for a new pipe section to be arranged above the upper end of the lowered pipeline. Both pipe ends have pipe end preparations, so called bevels that are made to create the weld gutter when the pipe ends are placed on each other.

The welding of two pipe sections requires exact positioning of the welding equipment, in particular the welding heads with respect to the weld gutter. Also, the position of the two pipe ends to be joined relative to each other is subjected to strict requirements before welding may start. Since pipe sections from a pipe manufacturer may not be perfectly shaped, it is impossible to get a line up where the two pipe ends line up perfectly with each other all around the circumference of the pipe. At least at certain locations the walls of the pipe sections may not line up exactly with each other. The misalignment between the pipe walls of the two pipe sections is known as hi-lo. Around the circumference of the pipe the maximum hi-lo is generally kept as small as possible and should always be smaller than a maximum specified value, which may be as small as 0.5 millimeter. Small hi-lo values are required in particular when welds are subjected to fatigue loading as is for instance the case in risers. For fatigue loaded welds it is important to keep the bending stresses, and stress concentration over the weld as low as possible in order to achieve a favorable fatigue life of the weld. Positioning the pipe ends relative to each other is a delicate job that needs to be performed very accurately so that the hi-lo is minimized over the full circumference of the gutter. Currently the process of getting the best line-up is performed manually and can cost considerable time of adjustment and checking, especially when requirements are strict. Measurement systems according to the prior art that may assist in the line up are not able to measure all the geometrical data. Measurement systems according to the prior art (see for example WO2006/112689) are provided with a measuring device for measuring geometrical data in a measurement direction which is perpendicular to the centerline of the pipe. In this way, it is difficult if not impossible to measure the thickness of the landing zone and the hi-lo between the inner diameters of both pipe ends.

SUMMARY OF THE INVENTION

It is an object of the current invention to provide an improved measurement system and/or to provide an alternative for the measurement system according to the prior art. According to the invention a measurement system is provided constructed and arranged to measure geometrical data from two pipe end bevels of two pipe sections that need to be joined, the measurement system being provided with at least one measuring device, wherein the measurement system is constructed and arranged so that the at least one measuring device is moveable in between the two pipe end bevels and at least one of the two pipe end bevels is within the measurement angle of the at least one measuring device.

By the at least one measuring device being moveable in between the two pipe end bevels it is possible to perform a relative measurement of both pipe end bevels, which gives a very exact measurement. By having the measurement direction of the at least one measuring device in the same direction as the center line of the pipe, the measuring device is capable of measuring all geometrical data of the at least one pipe end bevel. The geometrical data may also be used to optimize the welding of the pipe ends, the data being used to steer an automated welding apparatus constructed and arranged to weld pipe ends together. By having all geometrical data available for the automated welding apparatus the welding apparatus may improve welding of the pipe ends.

According to a further embodiment of the invention there is provided a pipe handling system for handling a first pipe section with respect to a second pipe section, wherein the handling system comprises a first and a second pipe clamp for holding and/or positioning the first and second pipe sections respectively and the handling system is provided with a measurement system according to the invention.

According to a further embodiment of the invention a method of joining two pipe sections is provided, the method comprising:

moving a measurement system comprising at least one measuring device in between the two pipe end bevels of the two pipe sections; and, measuring geometric data with the at least one measuring device from the two pipe end bevels while the at least one measuring device has a part of the two pipe end bevels within its measurement angle.

BRIEF DESCRIPTION OF THE DRAWINGS

The invention is further clarified with the help of the following figures.

DETAILED DESCRIPTION OF THE INVENTION

Figure 1:
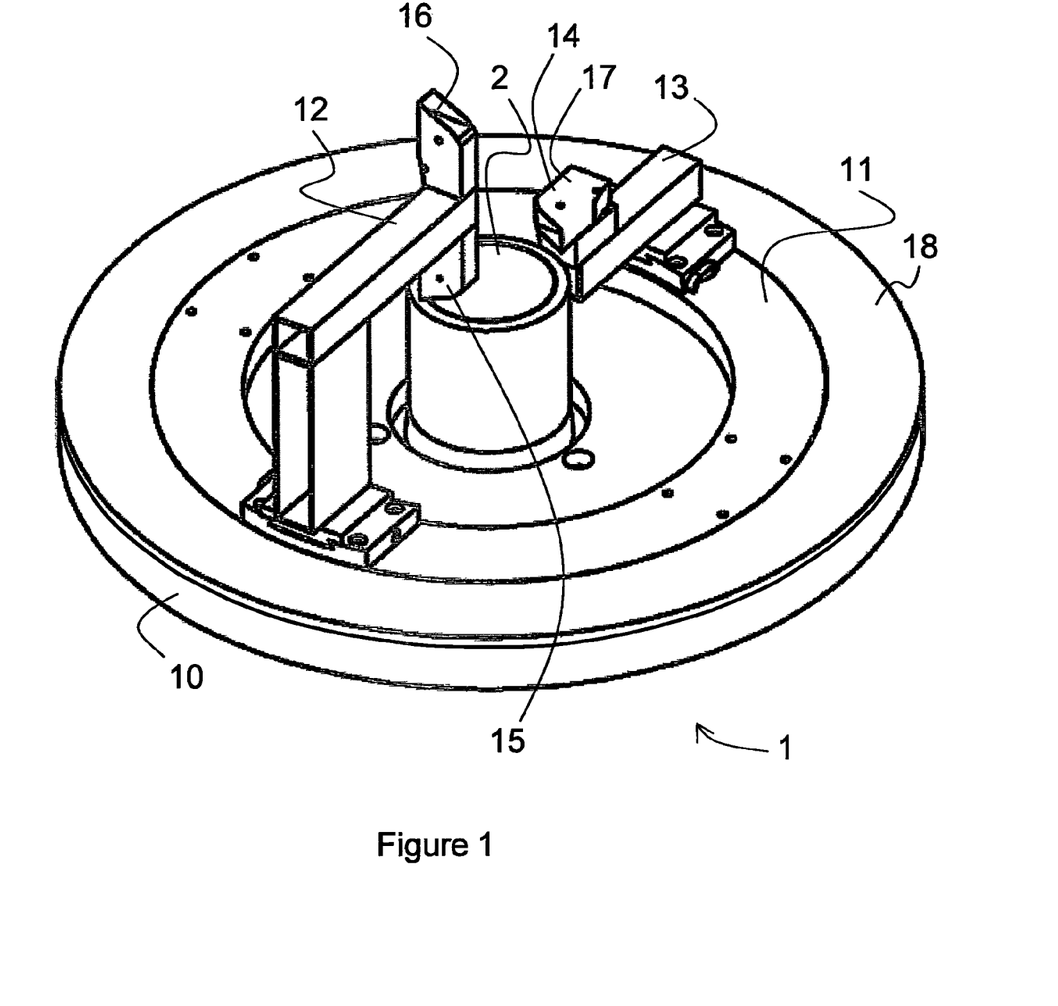
FIG. 1 shows an isometric view of a guiding device comprising a measurement system according to the invention.

FIG. 1 shows an isometric view of a guiding device comprising a measurement system according to the invention. Guiding device 1 is engaged with a collar (not visible) which may be a permanent collar forming an integrated part of a pipeline 2, or a temporary collar temporarily attached to or engaged with the pipeline 2. The guiding device 1 comprises a stationary part 10 and movable parts 11 and 18. Movable parts 11 and 18 are configured and arranged to rotate around the pipeline 2, each carrying measurement equipment. FIG. 1 shows that equipment carriers 12 and 13 can also be configured on one of the movable parts 11 or 18.

Line-up measurement tool 14 is used to position guiding device 1 with respect to the pipeline 2 after installation on the pipeline 2. More information with respect to the positioning of the guiding device 1 can be learned from WO 2008/030079, incorporated herein by reference. Measuring device 15 takes measurements of the bevel of the pipeline 2 and its relative position with respect to measuring device 15 and measuring device 16 measures the bevel of a new pipe section (not shown) and its relative position with respect to measuring device 16 which new pipe section in this embodiment is coming from above. Measuring devices 15 and 16 are part of a measurement system according to the invention and measure the geometrical data of the pipe end bevels to be joined and their relative positions with respect to each other by measuring in a direction parallel to the pipeline centerline.

Line-up measurement tool 14 may also measure the bevel top opening, weld seam separation and hi-lo in the bottom of the weld gutter as well as the hi-lo between the outside pipe diameters after the pipe sections have been positioned for joining. Alternatively a separate measuring device 17 is used.

With these data, and the geometrical data and relative positions measured by tools 15 and 16, the hi-lo at the internal bore and the contact area between both landing zones can be calculated. The line-up measurement tool 14 and the measuring system 15, 16 according to the invention may be using a laser, an image sensor, a mechanical sensing device comprising a mechanical feeler, a magnetic proximity switch or any other sort of device.

Figure 2:
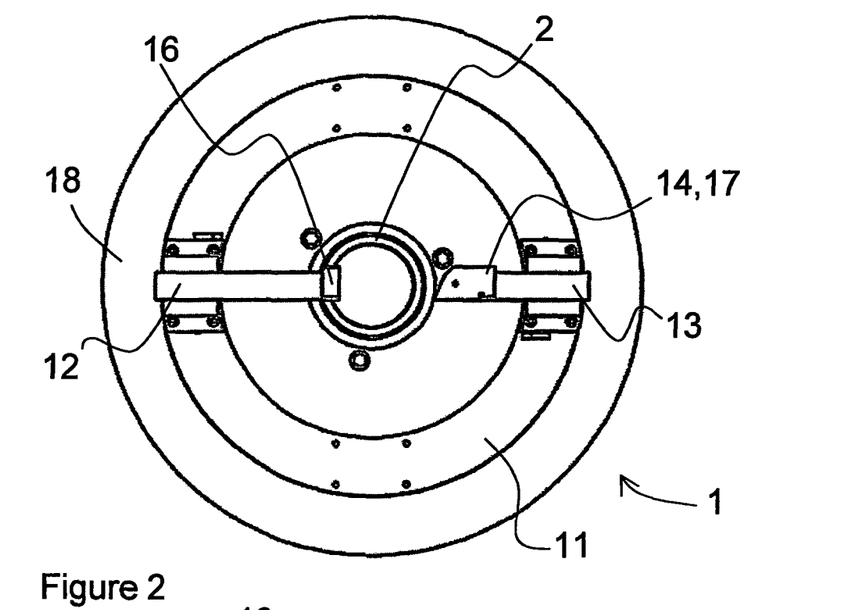
FIG. 2 shows a top view of the embodiment shown in FIG. 1.

FIG. 2 shows a top view of the guiding device 1 shown in FIG. 1. The numerals used refer to the same components as described in FIG. 1.

Figure 3:
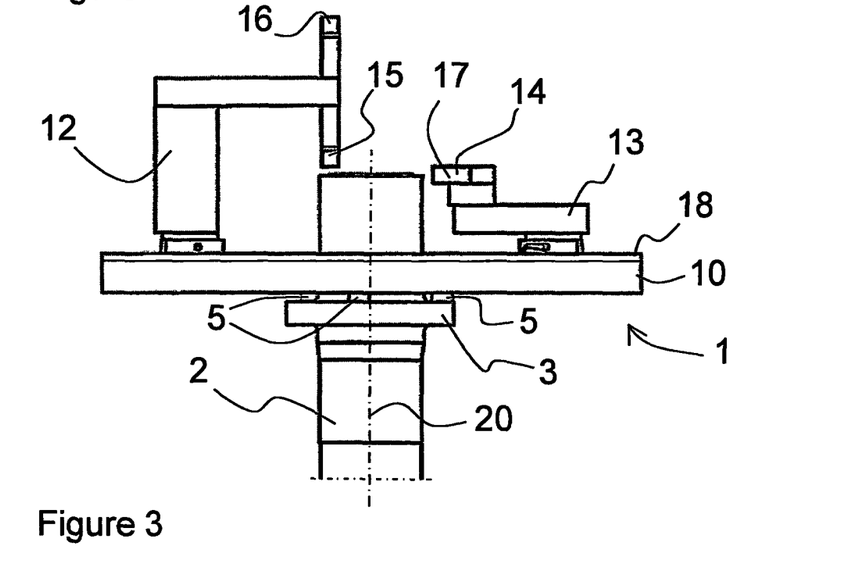
FIG. 3 shows a side view of the embodiment shown in FIG. 1.

FIG. 3 shows a side view of the guiding device of FIG. 1. From this figure it can be seen that the guiding device is supported by a collar 3 in or on the pipeline 2. Guiding device 1 rests on collar 3 with supports 5. These supports are adjustable so as to align the guiding device with the end of the pipeline 2. The centerline of the pipeline 2 is indicated with numeral 20. In this drawing the pipeline 2 is vertical, in practice the pipeline may be under an angle with the vertical or even horizontal.

Figure 4:
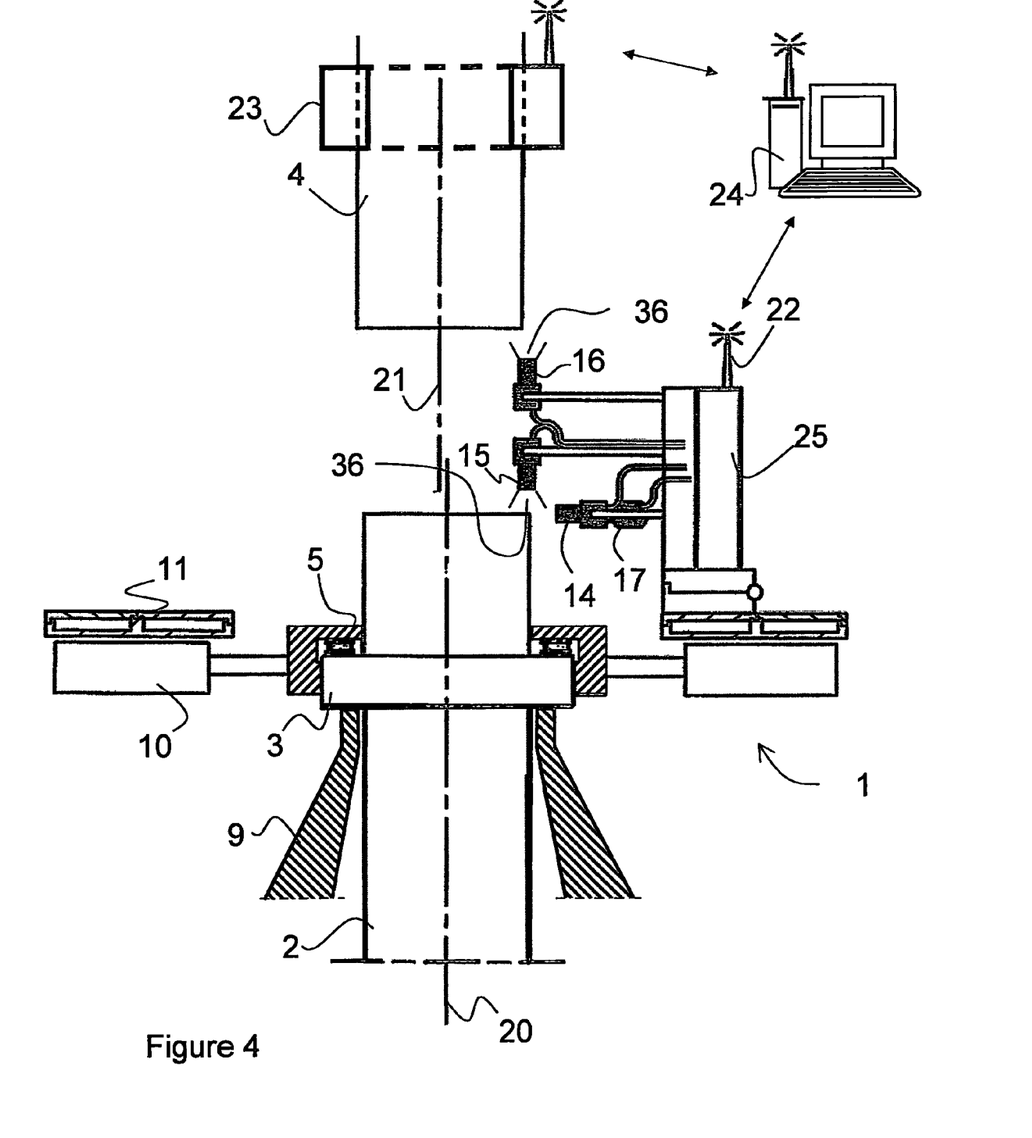
FIG. 4 shows a side view of an alternative embodiment of the measurement system according to the invention.

FIG. 4 shows a side view of an alternative embodiment of the invention. In this embodiment all measuring devices are carried by the equipment carrier 25.

Also shown is the new pipe section 4 that is roughly positioned above the already installed pipe 2 at a height that allows measuring devices 15 and 16 to be positioned between both pipe ends. Centerline 20 of the already installed pipeline and centerline 21 of the new pipe section 4 are not lined up precisely yet. Pipe section 4 is held by line-up clamp 23 which is used to accurately position pipe section 4 after measurements have been taken. Pipeline 2 is held by a clamping device, for instance hang off table 9. Antennas 22 are indicated to represent interfaces between the measuring devices, a computer 24, line-up clamp 23 and guiding device adjustable supports 5. The interfaces are preferably wireless however may also run via wires. Computer 24 processes the measured geometrical data. During positioning of the guiding device computer 24 may be used to calculate the required adjustment to the guiding device supports. After measuring the bevel top opening and position of the pipe sections the computer calculates the movements which line up tool 23 has to make for an optimal line-up. In a preferred embodiment there is an interface between computer 24, guiding device 1 and line up tool 23 for fully automatic line-up of the guiding device with respect to the end of the pipeline 2 and/or of the new pipe section 4 with the pipeline 2. Alternatively the adjustments can be made manually. The measuring devices 15, 16 provided to the measurement system according to the invention measure geometrical data over a measurement angle 36. The measurement angles 36 allow the measuring devices 15, 16 to take measurements in directions substantially parallel to the centerlines 20, 21 respectively. At least a part of the pipe end bevels of pipe section 4 and pipeline 2 is within the measurement angle 36 of the measuring devices 15, 16 of the measurements system according to the invention. The measuring devices 15, 16 may be moved around the new pipe section and the installed pipeline by movement of one of the moveable parts 11 or 18 of the guiding device 1.

Figure 5:
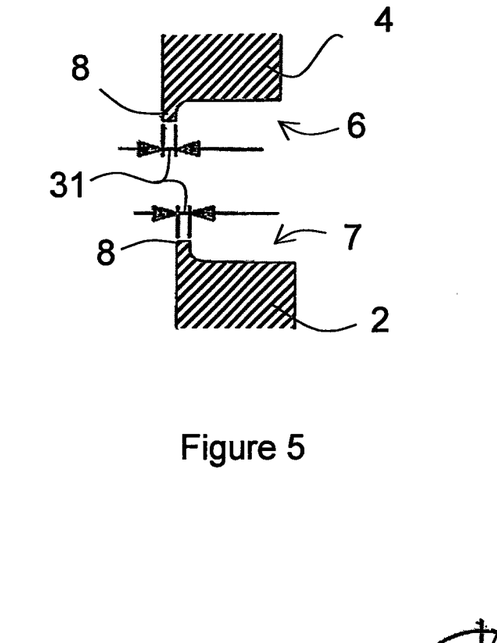
FIG. 5 shows an example of a typical pipe end preparation.

FIG. 5 shows a detail of the pipe ends 6, 7 of two pipe sections 2 and 4 with a typical pipe end preparation for offshore pipeline welding. On the inside of the pipe wall there is a bevel nose or landing zone 8 with a thickness 31. The bevel noses need to be placed on each other as precisely as possible during line-up.

Figure 6:
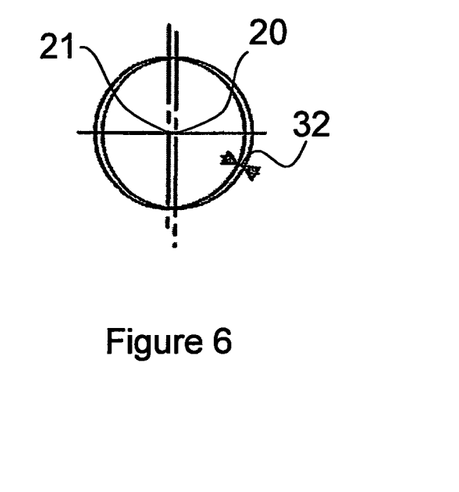
FIG. 6 shows an example of two pipe ends with a misalignment relative to each other in the plane perpendicular to the pipe center line.

FIG. 6 shows an example of two pipe ends that are misaligned with respect to each other. These pipe ends are not perfect as to their inside and outside diameter, wall thickness, roundness and squareness. The misalignment between the two pipe ends in a plane perpendicular to the pipeline center lines 20, 21 is indicated by numeral 32 and is measured around the circumference of the pipes. From this measurement the movements of the line up tool 23 for achieving an optimal alignment of both pipe ends can be calculated. The optimal alignment in this context means positioning the non-perfectly shaped pipe ends such that the following is achieved:

a minimal gap between the two pipe ends in a direction parallel to the pipeline centerline, a minimal hi-lo between the inside and outside diameters of both pipe ends 2 and 4 in radial direction perpendicular to the center line and a maximum contact area between the landing zones 8 of both pipe ends 2 and 4.

Before moving the pipe ends 2 and 4 to each other, the measuring devices 15 and 16 must be removed from the zone between both pipe ends 2 and 4, for instance by rotating or translating them away.

Figure 7:
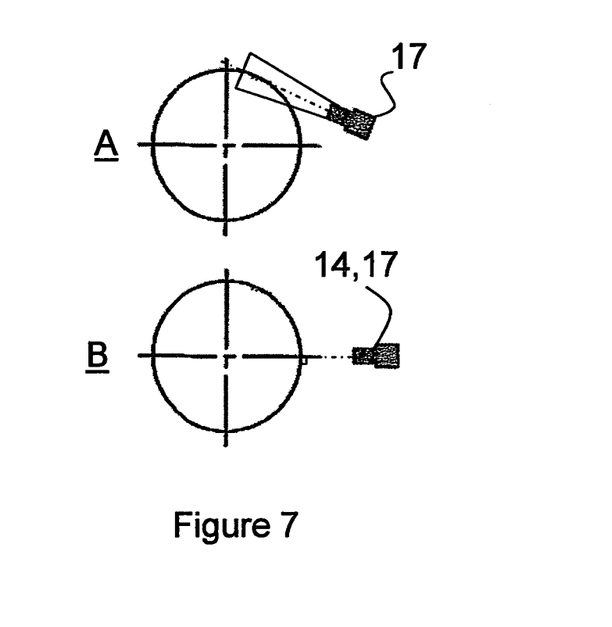
FIG. 7 shows the principle of the confirmation measurements that are taken after line up of the pipe ends.

FIG. 7 shows the principle of the confirmation measurements that are taken after the new pipe section has been lined up with respect to the pipeline. These measurements are taken by the measuring devices 14 and/or 17.

In FIG. 7A measuring device 17 is drawn under an angle relative to the pipe. Measuring device 17 is measuring over the outer surface of the pipe and may comprise one or more cameras or a laser sensor or a mechanical sensing device.

FIG. 7B shows the principle in case a measuring device 14 oriented in radial direction to the pipeline is used for measuring the line-up of both pipe ends. A measuring device according to this principle is published in WO 2006/112689, incorporated herein by reference.

An advantage of using measurement devices 14 and/or 17 is that the measurements for positioning the guiding device and for the confirmation after line-up may be taken with the same measuring device 14, 17. The geometrical data measured with the measuring devices 14 and/or 17 may also be used for steering an automated welding system.

Figure 8:
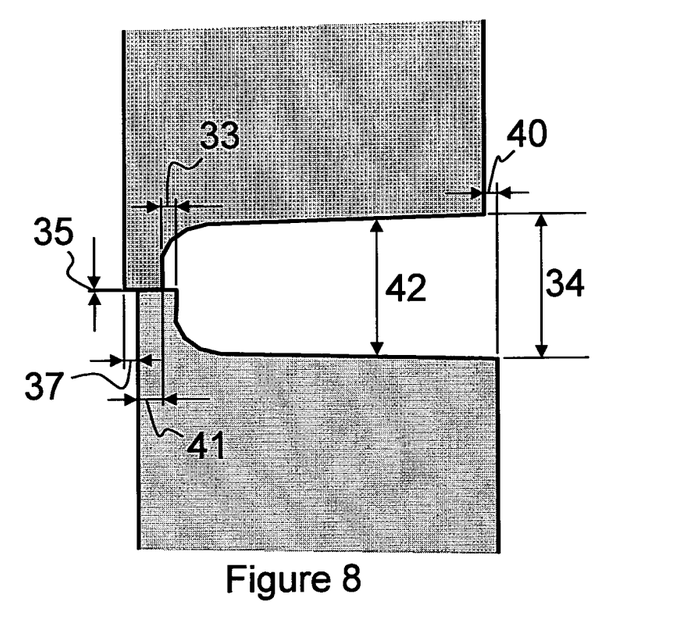
FIG. 8 shows the information available after line-up of the two pipe ends.

FIG. 8 shows the confirmation measurements that may be taken from the two pipe ends after line-up. The measurement taken by measuring devices 14, 17 confirm the achieved values of the measured hi-lo between the outside diameters of both pipe ends 40; hi-lo between the outside diameters of the bevel noses 33; the bevel top opening 34; and the weld seam separation 35, which should be minimized.

Achieved values of the actual hi-lo between the inside diameters of both pipe ends 37; the contact area between the landing zones of both pipe ends 41; and the width of the weld gutter between the bevel flanks 42 can only be obtained by combining the confirmation measurements by measuring devices 14, 17 taken after line-up with the measurements by measuring devices 15, 16 taken before line-up.

Figure 9:
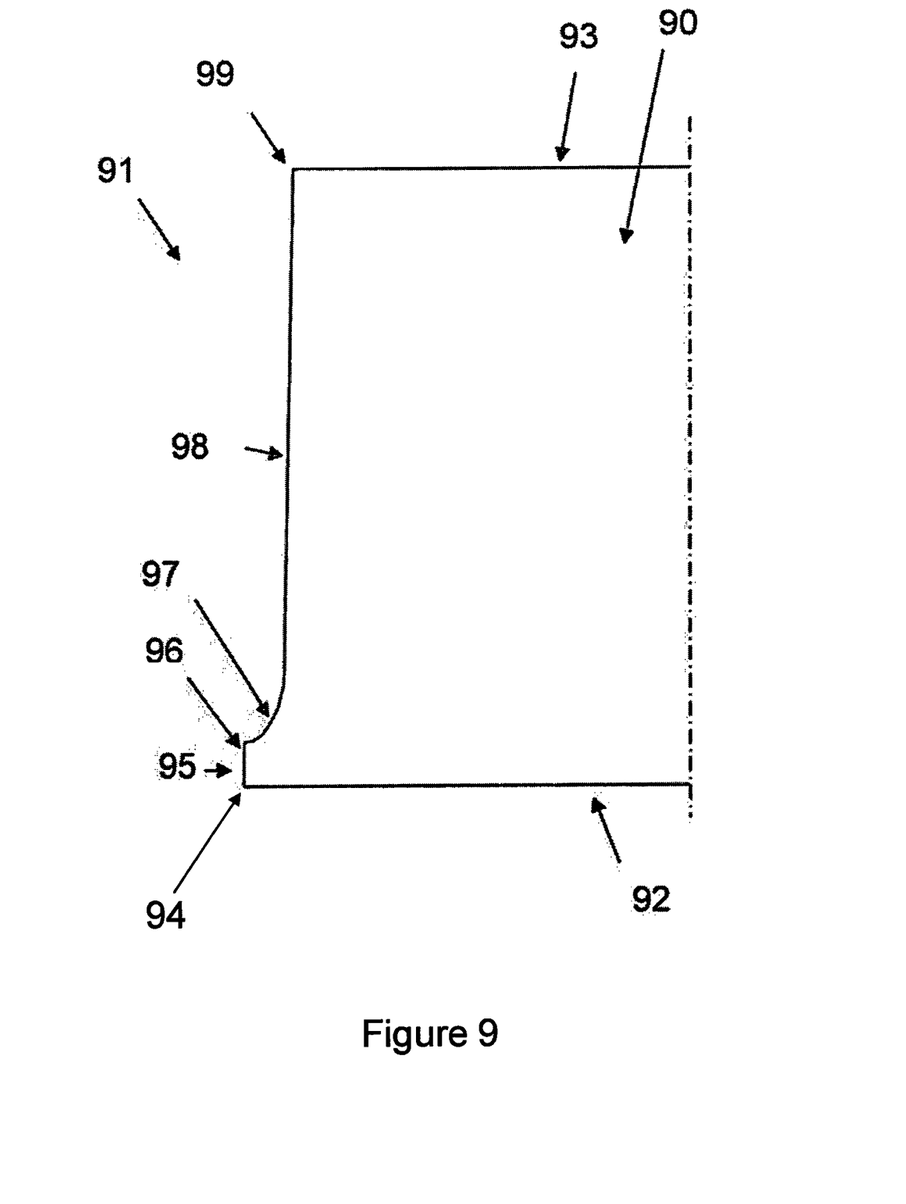
FIG. 9 shows a cross-section over the wall of a pipe end.

FIG. 9 shows a cross-section over the wall of the end 90 with typical pipe end bevel 91. A typical narrow gap pipe end bevel 91 is formed by the following characteristic points and sections:

the transition point 94 between the inner wall of the pipe end 92 and the landing zone 95. Typically, the angle of transition point 94 is approximately 90°. The transition point 94 cannot be precisely measured from a direction perpendicular to the centerline and from the outside of the pipe because the view of the measuring device is very likely to be blocked by the landing zone 95;

the landing zone 95 may for example be 1 to 2 mm thick and perpendicular to the centerline of the pipe. The size of the landing zone cannot be precisely measured unless the transition point 94 can be precisely measured.

the transition point 96 between the landing zone 95 and the transition curve 97. Typically, the angle of transition point 96 is approximately 90°.

the transition curve 97 between the transition point 96 and the bevel flank 98. The transition curve may have a radius of 2 to 3 mm.

the bevel flank 98, typically at an angle of 85 to 90° with the center line.

the transition point 99 between the bevel flank 98 and the outer wall of the pipe end 93. Typically, the angle of transition point 99 is 85 to 90°.

The measuring devices 15 and 16 (see FIG. 4) can measure exactly the geometric data of the pipe ends 2 and 4 respectively. The measuring devices 15 and 16 can exactly measure the transition point 94 and the size, position and form of the landing zone because the sensors are oriented such that a direction parallel to the center line of the pipe is within the measurement angle of the sensor. The geometric data can be used to position the guiding device 1, or after the measuring devices 15 and 16 have been moved away, to optimize line-up of the new pipe section 4 with the installed pipeline 2 and after line-up for steering an automated welding system according to U.S. patent application 61/043,018 (PCT/NL2009/000085), incorporated herein by reference. From the known position of the measuring devices 14, 15, 16 and/or 17 with respect to each other also the relative position of the new pipe section 4 relative to the end of the pipeline 2 can be calculated. It is therefore very important that the measuring devices 14, 15, 16 and 17 according to the invention are positioned with respect to each other in a stable manner.

Figure 10:
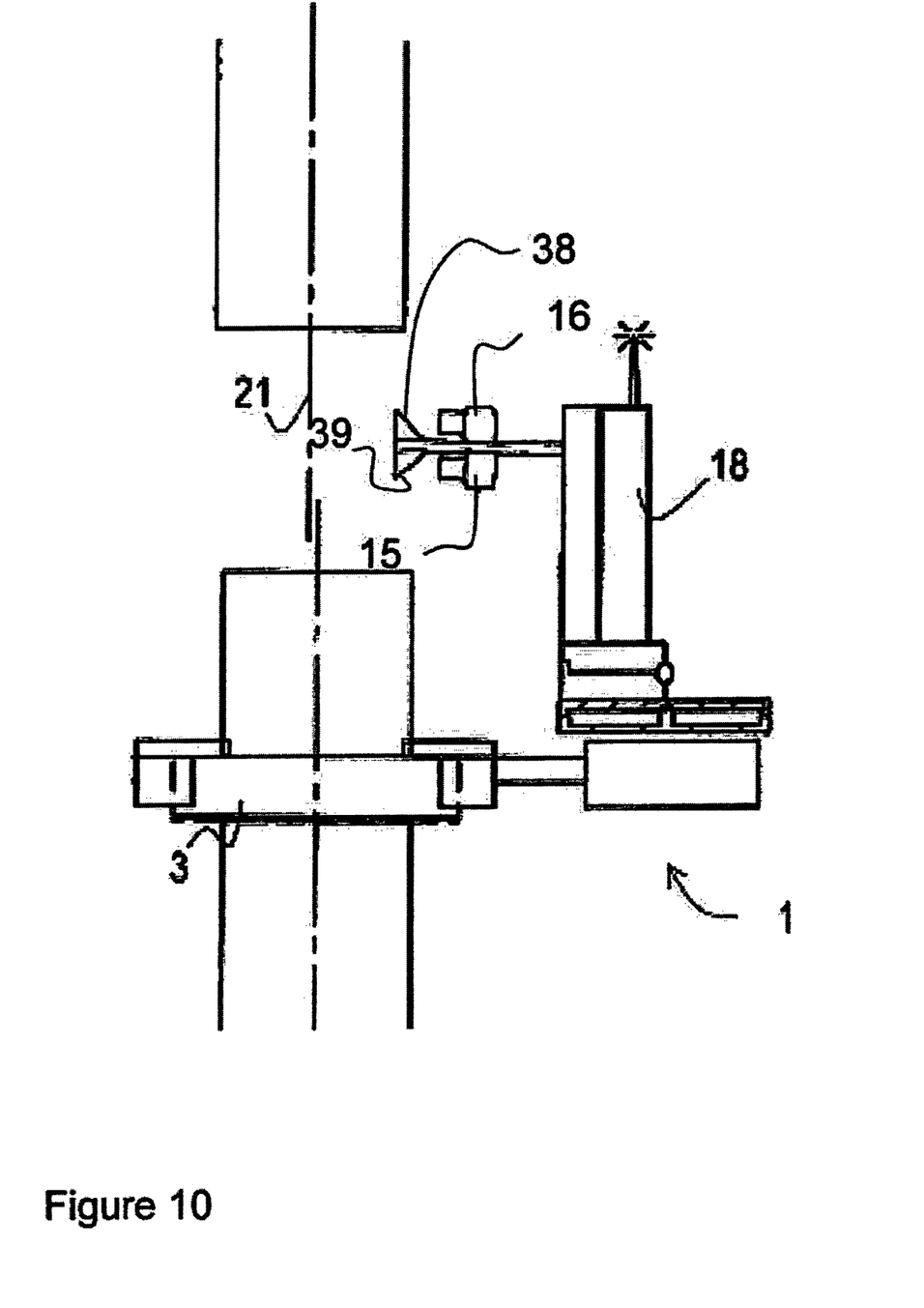
FIG. 10 shows a side view of a further alternative embodiment according to the invention.

FIG. 10 discloses an alternative embodiment according to the invention in which the measuring devices 15, 16 are provided with mirrors 39, 38, respectively. The mirrors 38, 39 and the measuring devices 15, 16 are mounted together on a frame so that their position is very stable with respect to each other. The measuring devices provided with the mirrors are oriented such that a direction parallel to the center line of the pipe is within the measurement angle of the mirror. An advantage of the alternative embodiment of the invention is that the mirrors make a compact configuration possible of the measurement system according to the invention. An even more compact configuration may be possible if one measuring device would be used to measure geometrical data from the two pipe end bevels simultaneously via the two mirrors 38, 39.

The method to use the equipment according to the invention comprises one or more of the following steps:

1. A line-up measuring device measures misalignment between a reference plane related to the guiding device and the pipe end it is engaged with.
2. The collected data is used to line up the guiding device relative to the pipe end it is engaged with. The guiding device is equipped with at least one adjustable support. By adjusting the support(s) the working plane of the equipment on the guiding device can be adjusted to optimally line up with the working plane of the weld to be made.
3. Measuring the geometrical data and relative geometrical positions of the pipe ends of both the new pipe section and the installed pipeline with the measurement system according to the invention. The data collected during this measurement together with target values of hi-lo on inside and outside diameters and contact area of the landing zones are used to calculate the movements to be made for achieving an optimum line-up between the two pipe ends given their configuration. An interface with the pipe line-up tool may be used to move the new pipe section in accordance with the calculated movements.
4. Line up the new pipe section with the pipeline by carrying out the calculated movements.
5. Confirm optimal line-up.
6. Calculate achieved values of hi-lo on inside and outside diameters; contact area of the landing zones; and geometry of the weld gutter around the circumference
7. Weld the new pipe section onto the installed pipeline using the calculated values of achieved hi-lo, contact area and weld gutter geometry to steer the welding torch or to set the welding parameters of an automated welding system.

The invention claimed is:

1. A measurement system constructed and arranged to measure geometrical data from two pipe end bevels of two pipe sections that need to be joined, the measurement system being provided with at least one measuring device including an image sensor operative to measure geometrical data over a measurement angle, wherein the measurement system is constructed and arranged so that the at least one measuring device is moveable in between the two pipe end bevels and at least one of the two pipe end bevels is within the measurement angle of the at least one measuring device and one of the pipe sections has a centerline and the image sensor has a measuring direction and the image sensor is constructed and arranged to have the measuring direction substantially parallel to the centerline, wherein the at least one measuring device is constructed and arranged to measure data comprising information of a transition point between an inner wall and a landing zone of the pipe sections and wherein the measurement system is constructed and arranged to measure geometrical data of two pipe end bevels simultaneously.

2. The measurement system according to claim 1, wherein the measurement system is constructed and arranged so that the centerline is within the measurement angle of the at least one measuring device.

3. The measurement system according to claim 1, wherein the measurement system is constructed and arranged so that the position of the at least one pipe end bevel in a plane substantially perpendicular to a center line of the pipe can be measured.

4. The measurement system according to claim 1, wherein the at least one measuring device is constructed and arranged to measure data comprising information about the position, size and form of a landing zone of the at least one pipe end bevel.

5. The measurement system according to claim 1, wherein the at least one measuring device is constructed and arranged to measure geometrical data of the at least one pipe end bevel as a function of the circumferential position on the at least one pipe end bevel.

6. The measurement system according to claim 5, wherein the measurement system is constructed and arranged to move the at least one measuring device along the at least one pipe end bevel.

7. The measurement system according to claim 1, wherein the measurement system is constructed and arranged so that the at least one measuring device is moveable from in between the two pipe end bevels to a position not in between the two pipe end bevels.

8. The measurement system according to claim 1, wherein the at least one measuring device is provided with at least one mirror.

9. The measurement system according to claim 1, wherein one of the pipe sections that need to be joined is part of a pipeline.

10. The measurement system according to claim 1, wherein the system is provided with two measuring devices, and each measuring device has at least one pipe end bevel within its measurement angle.

11. A pipe handling system for handling a first pipe section with respect to a second pipe section, wherein the handling system comprises a first and a second pipe clamp for holding and/or positioning the first and second pipe sections respectively and the handling system is provided with a measurement system according to claim 1.

12. A method of joining two pipe sections, the method comprising:

moving a measurement system comprising at least one measuring device including an image sensor operative to measure geometrical data over a measurement angle in between the two pipe end bevels of the two pipe sections; and measuring geometrical data with the at least one measuring device from the two pipe end bevels while the at least one measuring device has a part of the two pipe end bevels within its measurement angle and one of the pipe sections has a centerline and the image sensor has a measuring direction and the image sensor is constructed and arranged to have the measuring direction substantially parallel to the centerline and measuring geometrical data comprises measuring information of a transition point between an inner wall and a landing zone of the pipe sections and measuring geometrical data of two pipe end bevels simultaneously.

13. The method according to claim 12, wherein the method comprises moving the at least one measuring device in a rotational direction along the pipe end bevel.

14. The method according to claim 12, wherein the method comprises lining-up of the pipe section with another pipe section using the geometrical data.

15. The method according to claim 12, wherein the method comprises lining-up of a pipe section with an already installed pipeline using the geometrical data.

16. The method according to claim 12, wherein the method comprises welding the pipe section to another pipe section using the geometrical data.

17. The method according to claim 12, wherein the method comprises welding the pipe section to an already installed pipeline using the geometrical data.

* * * * *